US006247512B1

(12) United States Patent
Radulescu

(10) Patent No.: US 6,247,512 B1
(45) Date of Patent: *Jun. 19, 2001

(54) TIRE HAVING TREAD PORTION WITH RUBBER TO CONTROL WEAR

(75) Inventor: Robert C. Radulescu, Simpsonville, SC (US)

(73) Assignee: Michelin Recherche et Technique S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,337

(22) Filed: Mar. 2, 1998

Related U.S. Application Data

(63) Continuation-in-part of application No. 08/706,951, filed on Sep. 3, 1996, now abandoned.

(51) Int. Cl.[7] .............................. B60C 1/00; B60C 11/00
(52) U.S. Cl. ........................................ 152/209.5; 152/532
(58) Field of Search ............................ 152/209.5, 209.7, 152/905, 532

(56) References Cited

U.S. PATENT DOCUMENTS

| 3,486,545 | 12/1969 | Niclas et al. . |
| 3,853,164 | 12/1974 | Mirtain . |
| 3,931,844 | 1/1976 | Mirtain . |
| 4,249,588 | * 2/1981 | Egan .................................. 152/209.7 |
| 4,273,177 | 6/1981 | Nybakken . |

(List continued on next page.)

FOREIGN PATENT DOCUMENTS

| 557 101 | 8/1993 | (EP) . |
| 2 215 331 | 8/1974 | (FR) . |

(List continued on next page.)

OTHER PUBLICATIONS

Translation for Japan 54–38004.*
Blow, Rubber Technology and Manufacture, p. 349–356, 1971.*

(List continued on next page.)

*Primary Examiner*—Steven D. Maki
(74) *Attorney, Agent, or Firm*—Martin Farrell; Alan A. Csontos; Robert R. Reed

(57) ABSTRACT

A tire comprising a pair of beads; a carcass ply having ends, each ends anchored to a respective bead; at least one belt ply extending circumferentially around the tire and disposed radially outward of the carcass ply; and a tread portion disposed radially outward of the belt ply. The tread portion has a plurality of tread ribs or blocks and at least one groove disposed between adjacent tread ribs or blocks. In one aspect of the invention, the tread portion is formed from first and second rubber portions. The second rubber portion has a hysteresis value greater than the first rubber portion and a modulus value less than first rubber portion. In another aspect of the present invention, the tread portion is formed from a first and second tread compound. The hysteresis value of the second tread compound is greater than the hysteresis value of the first tread compound and the modulus value of the first tread compound is less than the modulus value of the second tread compound. In another aspect of the present invention, the tread portion is formed from a rubber with a modulus of between approximately 2 and 3 N/mm², and a tan δ value of between approximately 0.2 and 0.4 under normal operating conditions. The present invention reduces the maximum longitudinal contact stress, maximum lateral contact stress, and the maximum normal contact stress on the tread layer relative to conventional tires, hence increasing the robustness of the tire with respect to tread wear.

1 Claim, 15 Drawing Sheets

U.S. PATENT DOCUMENTS

| | | | |
|---|---|---|---|
| 4,373,566 | | 2/1983 | Hirakawa et al. . |
| 4,381,810 | * | 5/1983 | Cady et al. ......................... 152/209.5 |
| 4,385,653 | * | 5/1983 | Okazaki et al. ................... 152/209.5 |
| 4,478,266 | * | 10/1984 | Pierson et al. .................... 152/209.5 |
| 4,603,721 | * | 8/1986 | Kogure et al. .................... 152/209.5 |
| 4,671,333 | | 6/1987 | Rohde et al. . |
| 4,675,349 | * | 6/1987 | Palombo et al. ................... 152/209.5 |
| 4,735,247 | | 4/1988 | Makino et al. . |
| 5,109,902 | | 5/1992 | Kobayashi . |
| 5,176,765 | * | 1/1993 | Yamaguchi et al. .............. 152/209.7 |
| 5,181,976 | * | 1/1993 | Iwafune et al. ................... 152/209.7 |
| 5,417,267 | | 5/1995 | Naoi et al. . |
| 5,479,977 | * | 1/1996 | Tamano et al. ................... 152/209.5 |
| 5,614,041 | * | 3/1997 | Dumke et al. .................... 152/209.5 |

FOREIGN PATENT DOCUMENTS

| | | | |
|---|---|---|---|
| 753533 | | 7/1956 | (GB) . |
| 753963 | * | 8/1956 | (GB) . |
| 1 255 952 | | 12/1971 | (GB) . |
| 54-38004 | | 3/1979 | (JP) . |
| 59-120639 | * | 7/1984 | (JP) . |
| 62-283001 | * | 12/1987 | (JP) . |

OTHER PUBLICATIONS

Clark, Mechanics of Pneumatic Tires, p. 25–29, 1981.*
EPO Search Report for application No. 97113215.4—2306 (counterpart to parent application 08/706,951).

* cited by examiner

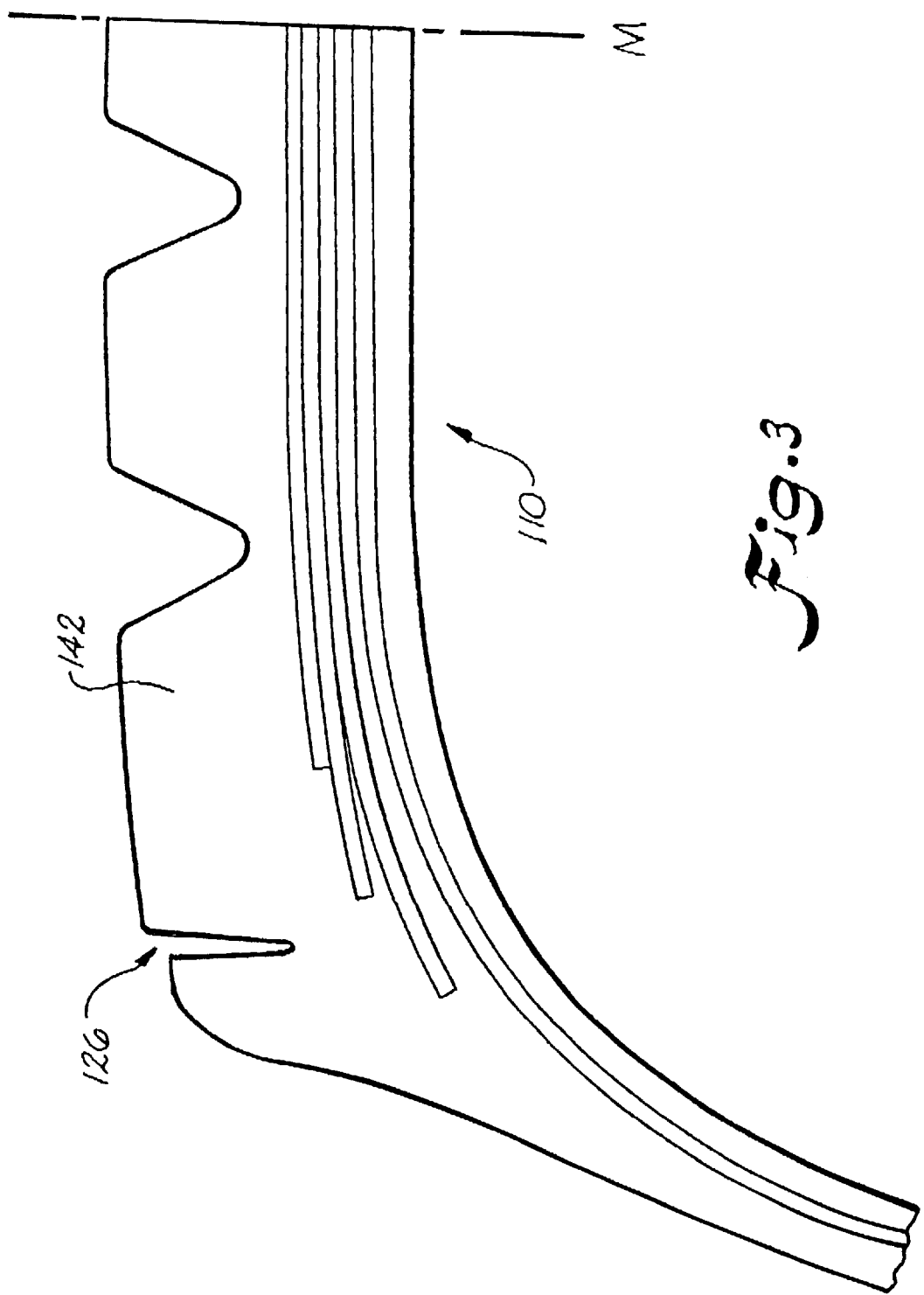

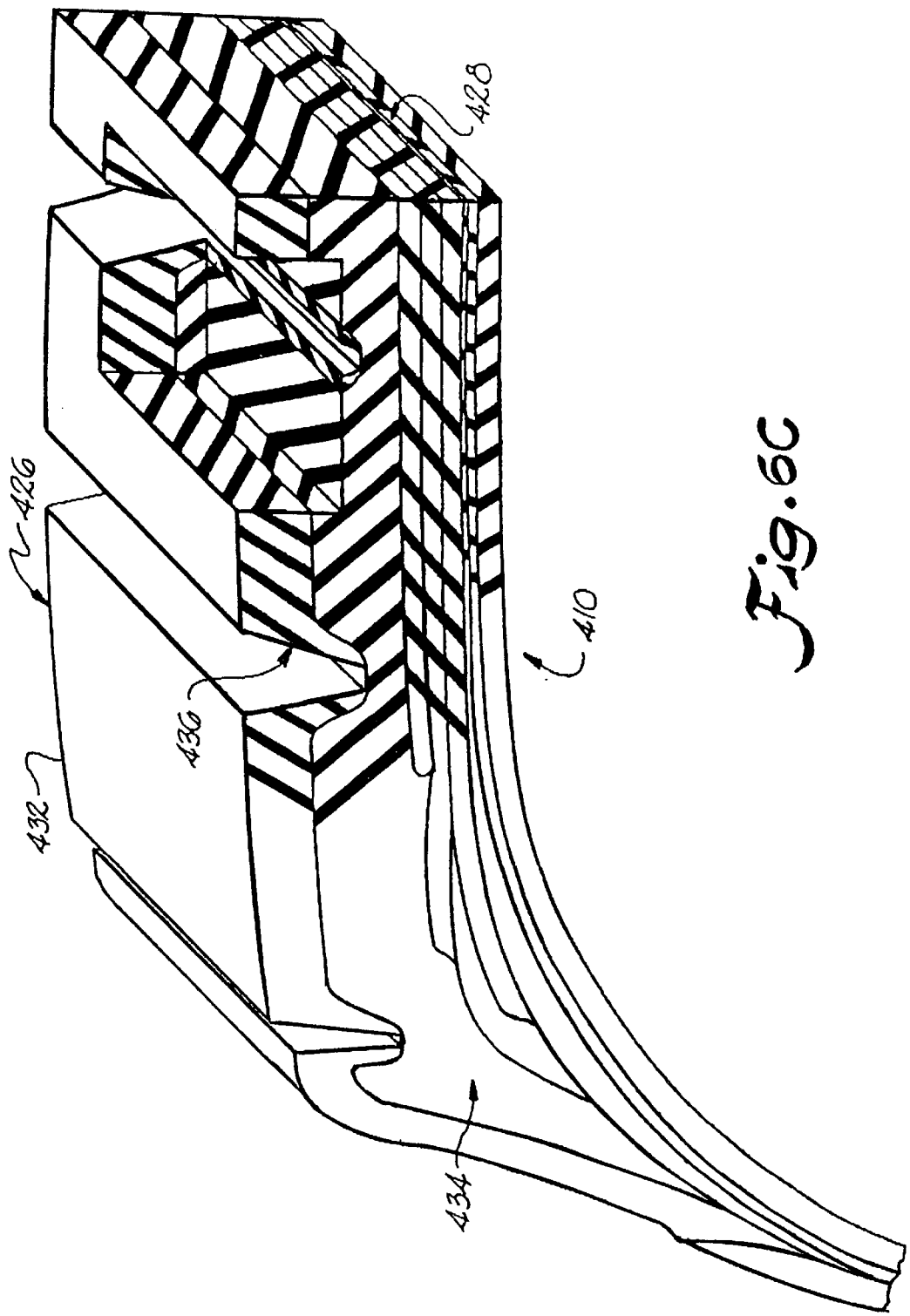

TIRE HAVING TREAD PORTION WITH RUBBER TO CONTROL WEAR

CROSS-REFERENCE TO RELATED APPLICATIONS

This application is a continuation-in-part of U.S. patent application Ser. No. 08/706,951 filed Sep. 3, 1996 now abandoned, herein incorporated by reference.

BACKGROUND OF THE INVENTION

The present invention relates to a new and improved pneumatic vehicle tire and, more particularly, to a new and improved pneumatic tire having a radial ply carcass or having a bias ply carcass.

The present invention relates to a pneumatic vehicle tire, especially for commercial vehicles, having a radial carcass, the plies of which are made of steel or of a material of comparable high strength, and the ends of which terminate at or around the tire beads. The tire has a centrally disposed tread strip and a multi-ply belt. Typically, in such a tire, the shoulders or lateral areas of the tire tread tend to wear at a greater rate than the central portion of the tread. This necessitates the premature scrapping of such tires due to their total wear in the shoulder area although the central portion of the tread is still satisfactory for substantial additional service. The severe conditions during the service life of a commercial tire as well as the differing impact of certain forces or stresses on the tire tread across its lateral or widthwise extent significantly contributes to the non-uniform distribution of tread wear.

In an attempt to overcome the drawbacks in presently known tires, it has been suggested to provide a tire specifically having a rubber component of a different property to beneficially affect the tire tread performance. For example, it has been suggested that additional rubber be incorporated in the laterally outward areas of the tread so that both the central and lateral portions of the tread will wear out at approximately the same time, notwithstanding the fact that the laterally outward areas of the tread wear more quickly than the central area. This solution may, however, cause an unwanted weight increase in the shoulder region which increases the heat build-up in the tire, thereby adversely affecting tire life. Moreover, increasing the quantity of material in the shoulder regions adds to the cost of manufacture of the tire.

U.S. Pat. No. 3,853,164 to Mirtain proposes another solution to the problem of disproportionate tread wear. Mirtain discloses a cushion, formed of a material harder than the material of the remainder of the tread, disposed between the tread and the breaker of the tire. The cushion extends to one or both of the lateral or outside walls of the tire. This solution also is not completely satisfactory because the use of such a hard cushion results in a ride quality which is substantially rougher than that of conventional tires. Furthermore, it has been found that the use of such a hard cushion tends to reduce the traction of the tire.

U.S. Pat. No. 4,671,333 to Rohde et al. discloses a tire with a low-damping rubber layer disposed between plies of a multi-ply breaker belt. Such tires achieve their best results when used with commercial vehicles. By providing a step in the shoulder region, by having the belt plies extend laterally into the stepped portions, and by possibly introducing a low-damping rubber layer between plies of the belt, it was hoped to achieve a tire having a reduced resistance to rolling. German Auslegeschrift 10 07 644 to Fletcher discloses a vehicle tire having a belt of steel cord fabric with a resilient rubber underlayer of a carcass rubber mixture disposed radially outwardly from an eight ply diagonal carcass of textile fabric. The belt plies extend at an angle of 45 degrees relative to the circumferential direction of the tire. The rubber underlayer serves to prevent detachment of the belt from the carcass due to the overall rigidity of the tire and the relative movement between the tread strip and the carcass resulting therefrom. The rubber underlayer is at least 2 to 5 mm thick.

U.S. Pat. No. 3,931,844 to Mirtain discloses a pneumatic tire having a cushion-like support under the tread member. The support is more supple, or softer, than the rubber mixture of the tread member. The cushion extends over the tire width and has a greater thickness in the midcircumferential plane region of the tire. The cushion has only a relatively small thickness in the shoulder regions of the tire. The disclosed tire is intended to provide uniform tire wear and improved traction.

Nonetheless, in spite of the attempts to ameliorate the problems of the tire tread performance through the strategic placement of special property rubbers, there still remains room for improvement in this approach to an improved tire.

SUMMARY OF THE INVENTION

Thus, it is an object of the present invention to provide a tire with improved tread performance.

It is a further object of the present invention to provide a tire having improved tread wear resistance.

It is a further object of the present invention to provide a tire that exhibits reduced stresses in the contact patch.

It is a further object of the present invention to provide a tread having a soft rubber compound which reduces the stresses in the contact patch.

It is a further object of the present invention to provide a tire that exhibits a phase lag between the stresses and strains occurring in the contact patch.

It is a further object of the present invention to provide a tread having a highly hysteretic material to produce a phase lag between the stresses and strains occurring in the contact patch.

These and other objects of the present invention are achieved by a tire comprising a pair of beads; a carcass ply having ends, each ends anchored to a respective bead; at least one belt ply extending circumferentially around the tire and disposed radially outward of the carcass ply; and a tread portion disposed radially outward of the belt ply. The tread portion has a plurality of tread ribs or blocks and at least one groove disposed between adjacent tread ribs or blocks.

One aspect of the invention is achieved by forming the tread portion from first and second rubber portions. The second rubber portion has a hysteresis value greater than the first rubber portion and a modulus value less than first rubber portion.

Another aspect of the invention is achieved by forming the tread portion from a first and second tread compound. The hysteresis value of the second tread compound is greater than the hysteresis value of the first tread compound and the modulus value of the first tread compound is less than the modulus value of the second tread compound.

Another aspect of the present invention is achieved by forming the tread portion from a rubber with a modulus of between approximately 2 and 3 N/mm², and a tan δ value of between approximately 0.2 and 0.4 when the tread is at ten percent (10%) deformation and 40° C.

BRIEF DESCRIPTION OF THE DRAWINGS

The features of the present invention will become apparent to those skilled in the art to which the present invention relates from reading the following specification with reference to the accompanying drawings in which:

FIG. 3 is an enlarged cross sectional view of a portion of a first alternative embodiment of the tread portion of the tire shown in FIG. 1;

FIG. 6C is an enlarged perspective view in partial section of another possible configuration of the rubbers used in a fourth embodiment of the tread of the tire shown in FIG. 1;

FIG. 7A is an enlarged cross sectional view of a possible configuration of the rubbers used in a fifth embodiment of the tread of the tire shown in FIG. 1;

DETAILED DESCRIPTION OF THE PREFERRED EMBODIMENTS

This application uses numerous phrases and terms of art. The phrase "mid-circumferential plane" refers to the plane passing through the center of the tread and being perpendicular to the axis of rotation of the tire.

The term "radial" refers to the direction perpendicular to the axis of rotation of the tire.

The term "axial" refers to the direction parallel to the axis of rotation of the tire.

The term "lateral" refers to the direction along the tread of the tire going from one sidewall of the tire to the other sidewall.

The term "groove" refers to an elongated void area in the tread that may extend circumferentially or laterally in a straight, curved of zig-zag manner.

The phrase "tread width" refers to the greatest axial distance across the portion of the tread in contact with a road surface, as measured from a footprint of the tire, when the tire is mounted on a rim, subjected to a load, and inflated to a pressure corresponding to the load. All of the other tire dimensions are measured when the tire is mounted on a rim and inflated to a given pressure, but not subjected to a load.

The term "modulus" refers to the modulus of elasticity of the rubber at ten percent (10%) elongation and at 40° C.

The term "tan δ" refers to the phase lag between the stresses and strains on the rubber at ten percent (10%) elongation and at 40° C.

Figure 1:
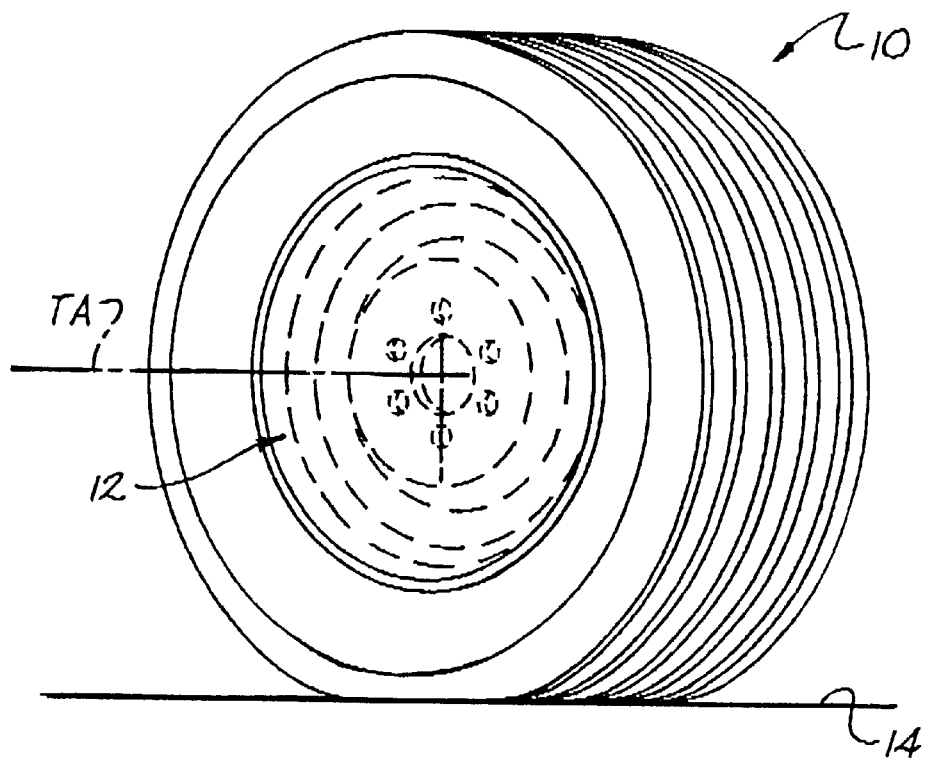
FIG. 1 is a perspective view of a tire mounted on a rim, the tire being shown in an inflated and loaded condition as exists when the tire supports a vehicle on a ground surface and the arrows schematically illustrating the distribution of the forces exerted by the inflation gas on the tire during rolling contact of the tire along the ground surface.

A tire 10 having improved resistance to wear that meets and achieves all the objects of the invention set forth above will now be described with reference to FIGS. 1, 2A and 2B. As seen in more detail in FIGS. 1 and 2A, the pneumatic tire 10 is adapted to be mounted on a rim 12. Tire 10 comprises at least one carcass ply 16 having ends 18 each secured to one of a pair of inextensible annular bead members 20. The bead members 20 securely mount the pneumatic tire 10 on the rim 12.

The pneumatic tire 10 additionally includes a pair of sidewall portions 22, each on opposite sides of the midcircumferential plane. Sidewall portions 22 extend from a location adjacent a bead member 20 to a shoulder region 24 at which the sidewall portion 22 is joined with a tread portion 26. The tread portion 26 forms the portion of the pneumatic tire 10 which is in contact with the ground surface 14 during rolling movement of the tire. Tread portion 26 may include conventional tire tread sculpture features such as, for example, circumferential grooves, lateral grooves 36, sides, or lamelles.

The pneumatic tire 10 also includes a plurality of circumferentially extending crown reinforcement belt plies 28 which are disposed radially intermediate the carcass ply 16 and the tread portion 26. The belt plies 28, as seen in FIG. 2A, may include a plurality of steel reinforcing cords 30 embedded in rubber or may alternatively include reinforcing cords of a material other than steel.

Figure 2B:
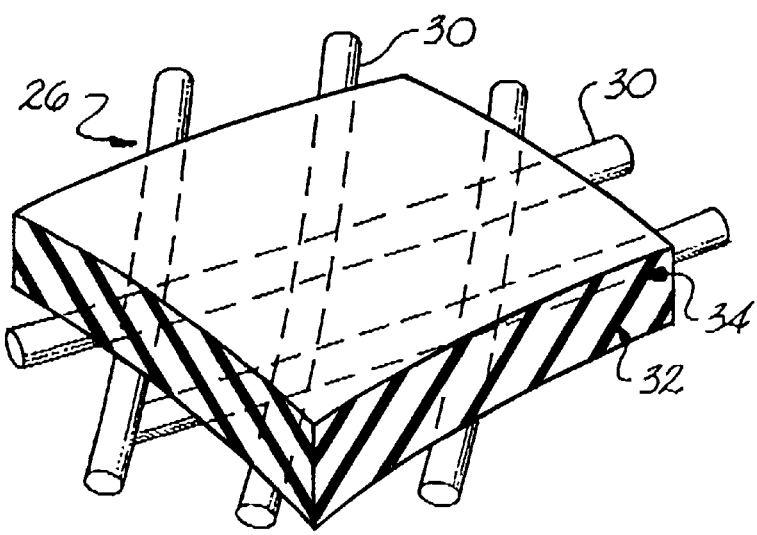
FIG. 2B is an enlarged perspective view of a differential element of the tire shown in FIG. 2A.
Figure 2A:
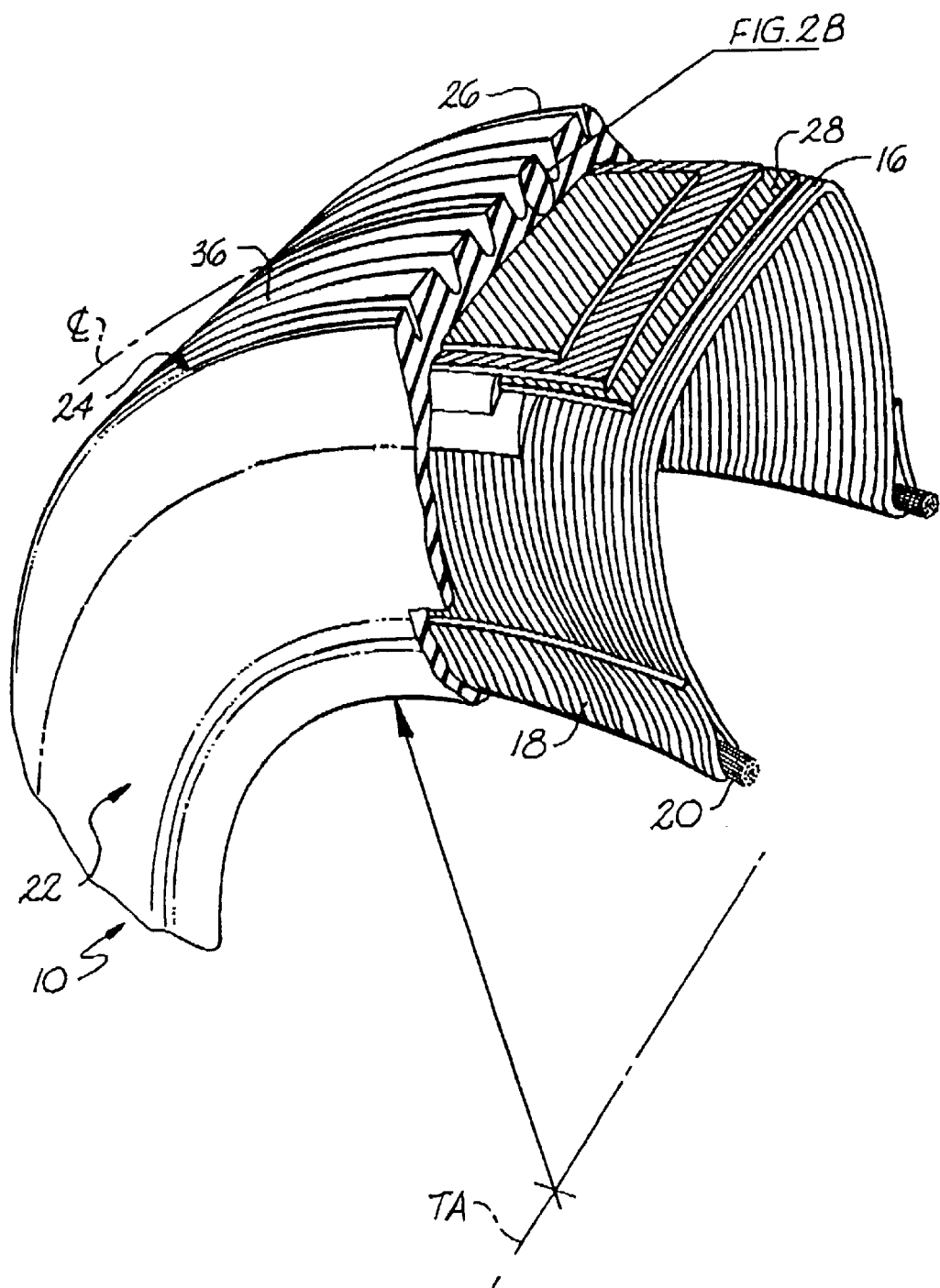
FIG. 2A is an enlarged perspective cross-sectional view of an angular portion of a first embodiment of the tire shown in FIG. 1.

As seen in FIGS. 2A and 2B, tread portion 26 includes both the rubber disposed beneath the tread sculpture (i.e. the undertread) and the tread ribs or blocks. Stated differently, tread portion 26 includes all of the rubber beginning at belt ply 28 and extending radially outward therefrom.

A ground contacting surface forms the radially outermost surface of a body region of tread portion 26. The numerous embodiments of the present invention, along with each alternative arrangement within an embodiment, are designed to achieve a specific balance between one or more tire performance characteristics (e.g. rolling resistance, endurance, wear resistance and traction) or tire manufacturing goals (e.g. quality, time, simplicity and the commonality of materials/processes). Other arrangements are possible which may achieve other suitable characteristics or goals. The various configurations of tread portion 26 of the present invention will now be individually described.

FIG. 3 demonstrates a first possible embodiment for the tread portion. Tire 110 has a tread portion 126 with a single tread rubber material 142. Tire 110 can best achieve the benefits of the present invention by adjusting several properties of single tread rubber portion 142. One property that could be varied in accordance with the present invention is the hardness of the rubber. A second property that could be varied in accordance with the present invention is the hysteretic properties of the rubber.

The modulus of elasticity can measure the hardness of a rubber. The modulus of elasticity of a composition is measured using any known technique that can provide stress measurements for a range of applied deformations under quasi-static conditions. As an example, conventional tread rubber compositions have a modulus of elasticity of between approximately 4 and 6 N/mm$^2$.

The value tan δ can indicate the hysteresis of a rubber. The tan δ value is measured using any known technique that provides a time history of the stresses generated by an applied deformation. As an example, conventional tread rubbers have a tan δ value between approximately 0.15 to 0.2.

In order to increase the robustness of tire 10 with respect to uneven tread wear, it is preferable to utilize a tread rubber material that is softer and more hysteretic than conventional materials. Tread rubber material 142 should be approximately twenty to fifty percent (20–50%) softer than conventional tread materials. When compared to conventional tread rubbers, tread rubber material 142 could have a modulus of elasticity of between approximately 2 and 4 N/mm$^2$ under the same conditions. Preferably, tread rubber material 142 is approximately fifty percent (50%) softer than conventional tread rubber materials. In other words, tread rubber material 142 should have a modulus of elasticity of between approximately 2 and 3 N/mm$^2$ under the same conditions.

Figure 10A:
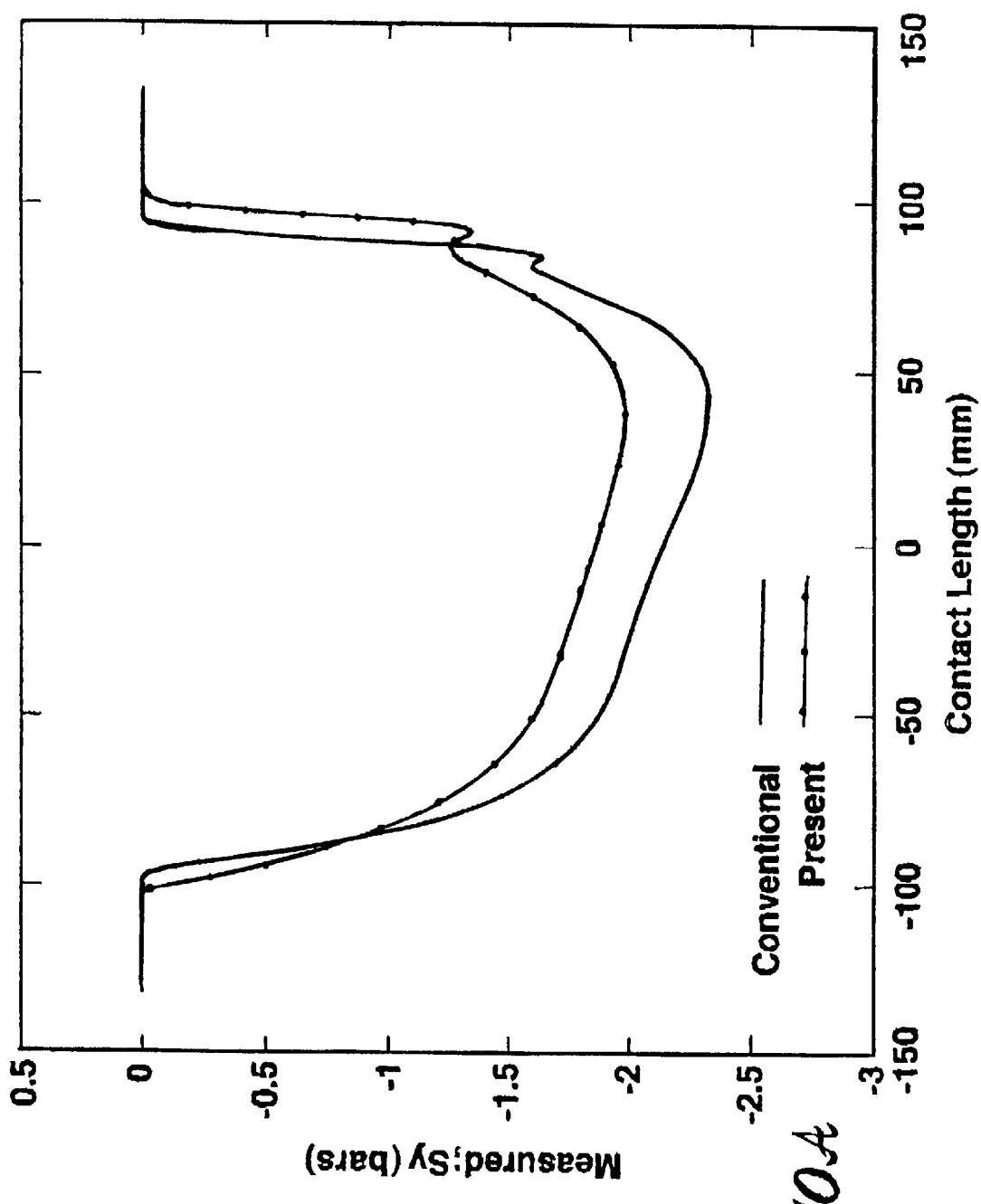
FIG. 10A is a graphical representation of the measured lateral contact stresses ($\sigma_y$) imposed on the contact length of a tire of the present invention compared to a conventional tire at a given slip angle.
Figure 10B:
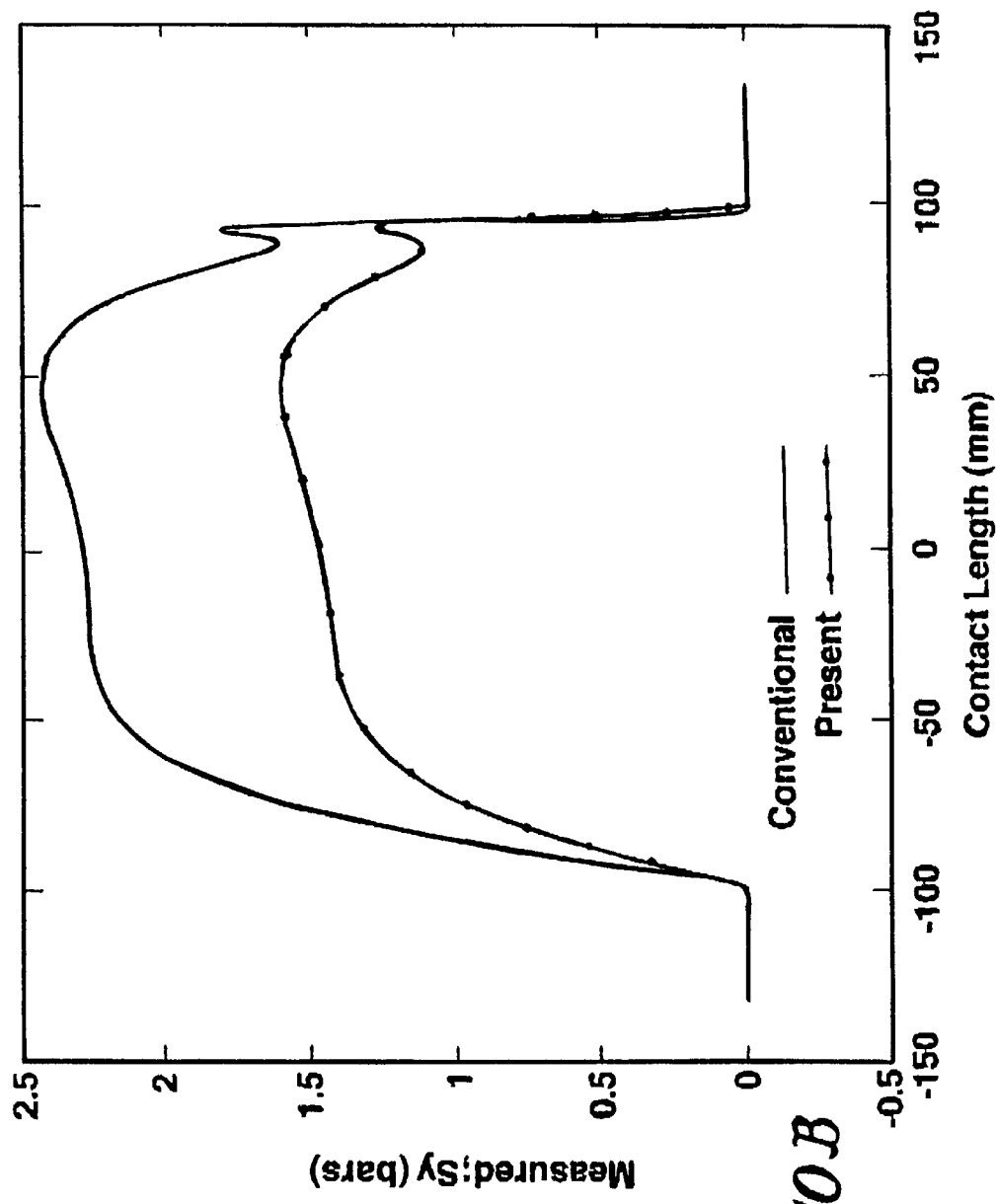
FIG. 10B is a graphical representation of the measured lateral contact stresses ($\sigma_y$) imposed on the contact length of a tire of the present invention compared to a conventional tire at another given slip angle.
Figure 11:
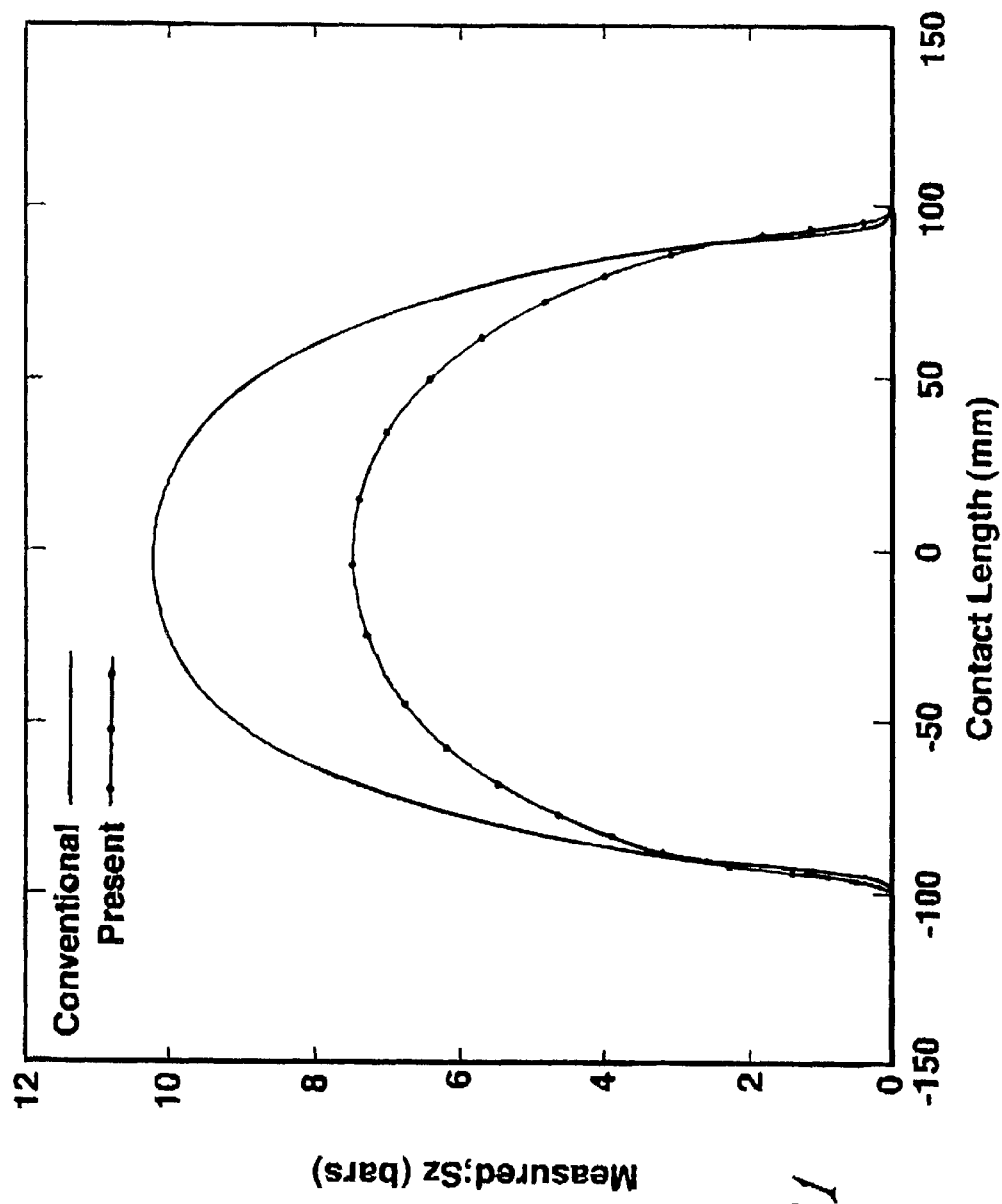
FIG. 11 is a graphical representation of the measured normal contact stresses ($\sigma_z$) imposed on the contact length of a tire of the present invention compared to a conventional tire.

FIGS. 9, 10A, 10B and 11 demonstrate the benefit of using a softer tread rubber material in a tire. The figures graphically represent the measured longitudinal contact stress ($\sigma_x$), lateral contact stress ($\sigma_y$) and normal contact stress ($\sigma_z$), respectively, imposed across the contact length of the tread portion of the tire having a softer tread material as described in the present invention compared to a tire having a conventional rubber tread portion. FIG. 10A displays the lateral contact stress ($\sigma_y$) at a negative slip angle. FIG. 10B displays the lateral contact stress ($\sigma_y$) at a positive slip angle.

The figures clearly demonstrate a reduction in the longitudinal contact stress ($\sigma_x$), lateral contact stress ($\sigma_y$) and normal contact stress ($\sigma_z$) when the tread portion of tire 10 utilizes a softer tread rubber as compared to the use of conventional tread rubbers. The reduced maximum lateral contact stress on the tread portion of the tire leads to a reduction in the slippage of the tread on the ground. Reducing the slippage thus reduces the rate of wear of the tire.

Table I summarizes the maximum longitudinal contact stress ($\sigma_x$), the maximum lateral contact stress ($\sigma_y$) and the maximum normal contact stress ($\sigma_z$) exhibited in FIGS. 9, 10A, 10B and 11. The table demonstrates a reduction in the maximum contact stresses when the tread portion of tire 10 utilizes a softer tread rubber as compared to the use of conventional tread rubbers.

TABLE I

| Type of Contact Stress | Normalized Value for Conventional Tire | Normalized Value for Tire of Present Invention | Percent Reduced |
|---|---|---|---|
| Longitudinal ($\sigma_x$) | 1 (reference) | 0.8 | 20 |
| Lateral ($\sigma_y$) with negative slip angle | 1 (reference) | 0.8 | 20 |
| Lateral ($\sigma_y$) with positive slip angle | 1 (reference) | 0.7 | 30 |
| Normal ($\sigma_z$) | 1 (reference) | 0.7 | 30 |

It is also preferable, in terms of uneven tread wear characteristics, to have tread rubber material 142 more hysteretic than conventional tread rubbers. Specifically, tread rubber material 142 should be approximately thirty to one-hundred percent (30–100%) more hysteretic than conventional tread rubbers. Compared to conventional tread rubbers, tread rubber material 142 should have a tan δ value of between approximately 0.2 to 0.4 under the same conditions. Preferably, tread rubber material 142 should have a tan δ value of approximately 0.3 under the same conditions.

A benefit of using a more hysteretic tread rubber material in a tire can be seen in the measured longitudinal contact stresses ($\sigma_x$) imposed across the contact length of the tread portion of a tire of the present invention compared to a tire having a conventional rubber tread portion. A phase lag can be shown to exist between the longitudinal contact stresses ($\sigma_x$) of a more hysteretic tread rubber and the longitudinal contact stresses ($\sigma_x$) of a conventional tread rubber. The introduction of a phase lag leads to more stable wear on a tire. A tire using a more hysteretic tread rubber is more robust with respect to uneven tread wear as indicated by the following experimental results.

A conventional, or reference, tire known in the art was tested along with a tire essentially the same as the conventional tire, but having the features of the present invention. In other words, the tire of the present invention included the new tread rubber in the tread portion. The tires were heavy duty truck tires with the same size, load range, and usage as defined by the Standards of the 1997 Yearbook of The Tire and Rim Association, Inc. of Copley, Ohio.

The test involved two conventional tires and two tires of the present invention. The tires were tested on the steer axles of two identical long haul vehicles. The tires were rotated between the vehicles to compensate for any differences in the vehicles' suspension systems. The right side tires were maintained on the right side of each vehicle when the tires were rotated. Numerous tire rotations occurred during the test period.

The tire testing continued until one of the tires exhibited anomalies or exhibited enough tread wear to warrant the removal of the tire from service. At that point, all of the tires were removed from service. Inspection of the tires revealed the following.

The conventional tires used in the experiment exhibited uneven tread wear. The tire of the present invention used in the experiment, however, did not exhibit any uneven tread wear. These results clearly establish the superior uneven tread wear characteristics of tires of the present invention.

Tread portion 126 with single tread rubber portion 142 can clearly provide superior uneven tread wear characteristics over conventional tread rubbers. The resulting superior uneven tread wear characteristics may, however, arise through the sacrifice of other tire characteristics. For example, tire 110 may not exhibit the rolling resistance and endurance characteristics of other tires. As a compromise between uneven tread wear characteristics, rolling resistance and endurance, it may be desirable to utilize only limited amounts of the softer, more hysteretic rubber material within the tread portion of the tire to improve the rolling resistance and endurance characteristics.

When limiting the amount, or volume, of the softer, more hysteretic material used in the tread portion, the remaining amount, or volume, of the tread portion of the tire should be occupied by a second tread rubber that has different properties than the first tread rubber compound. The use of the softer, more hysteretic rubber material at specific locations within the tread portion of tire 10 maintains the other tire performance characteristics while also providing superior uneven tread wear characteristics. Each alternative embodiment of the dual compound tread portion will now be described.

Figure 4:
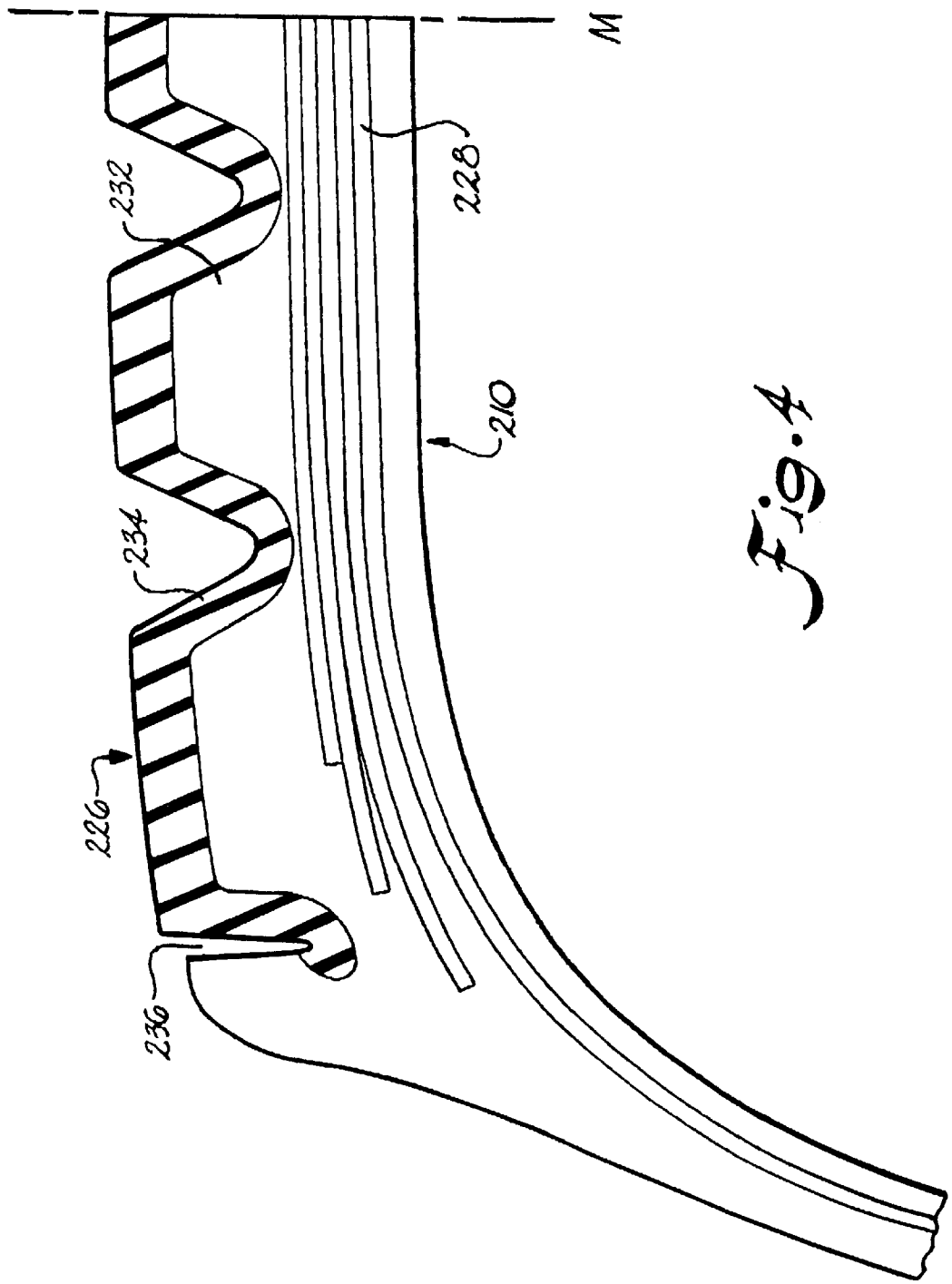
FIG. 4 is an enlarged cross sectional view of a portion of a second alternative embodiment of the tread portion of the tire shown in FIG. 1.

FIG. 4 demonstrates a second alternative embodiment of the present invention. Tire 210 includes a first rubber portion 232 positioned radially beneath a second rubber portion 234. First rubber portion 232 is formed on belts 228 and extends into the tread ribs or blocks (i.e. first rubber portion 232 begins at the interface and extends into the tread ribs or blocks). First rubber portion 232 extends laterally across the entire tread width of tread portion 226. First rubber portion 232 could use, for example, a conventional rubber composition.

Second rubber portion 234 is positioned radially outward from first rubber portion 232. Second rubber portion 234 does not substantially extend into the shoulder area of tire 210. Rather, second tread portion 234 extends between approximately the laterally outermost grooves 236 in tread portion 226. As seen in the figure, second rubber portion 234 forms the ground contacting surface of tread portion 226 or tire 210. Tread portion 226, having first rubber portion 232 and second rubber portion 234, is manufactured using known techniques.

Second rubber portion 234 should occupy between approximately twenty to fifty percent (20–50%) of the volume of tread portion 226. Since second rubber portion 234 maintains a relatively constant thickness across the tread width in this embodiment, the volume of tread portion 226 occupied by second rubber portion 234 can be approximated by its thickness. Thus, second rubber portion 234 should encompass between approximately twenty to fifty percent (20–50%) of the depth of tread portion 226. Recalling the discussion earlier, the depth of tread portion 226 includes the intertread. Preferably, second rubber portion 234 occupies approximately one-third of the total volume of tread portion 226. As stated above, this can be approximated by second rubber portion 234 encompassing approximately one-third of the total depth of tread portion 226.

Second rubber portion 234 can have the same properties as tread rubber material 142 in the first embodiment. Thus, second rubber portion 234 should be softer than first rubber portion 132. Specifically, second rubber portion 234 should be between approximately twenty and fifty percent (20–50%) softer than first rubber portion 232. Preferably, second rubber portion 234 is approximately fifty percent (50%) softer than first rubber portion 232.

In addition, second rubber portion 234 should be more hysteretic than first rubber portion 232. Specifically, second rubber portion 234 should be approximately thirty to one-hundred percent (30–100%) more hysteretic than first rubber portion 232. Preferably, second rubber portion 234 is fifty percent (50%) more hysteretic than first rubber portion 232.

The present invention does not require the second tread portion to be positioned as shown in FIG. 4. Applicant recognizes that the second rubber portion can be positioned at any suitable location within the tread portion of the tire. The volume occupied by the second rubber portion in the tread portion is more important to the present invention than the specific radial position of the second rubber portion in the tread portion. The following alternative embodiments establish that the second rubber portion can be positioned at numerous locations within the tread portion of the tire.

Figure 5:
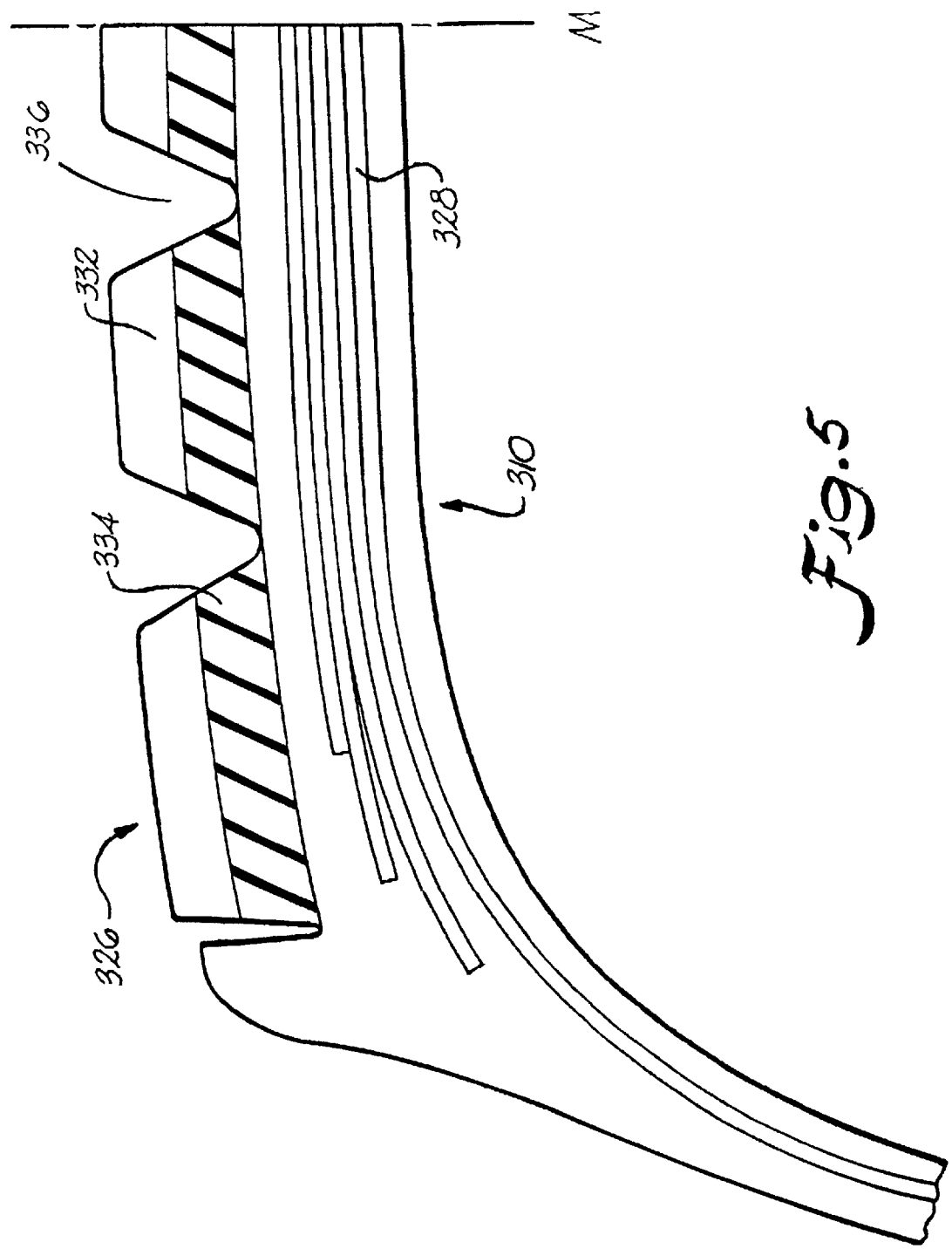
FIG. 5 is an enlarged cross sectional view of a portion of a third alternative embodiment of the tread portion of the tire shown in FIG. 1.

FIG. 5 demonstrates a third alternative embodiment of the present invention. Tire 310 includes a second rubber portion 334 positioned within each main tread rib. A first rubber portion 332 is formed on belt ply 328 and is positioned radially outward of second rubber portion 334. In other words, first rubber portion 332 envelops second rubber portion 334 in tread portion 326. Tread portion 326, having first rubber portion 332 and second rubber portion 334, is manufactured using known techniques.

Second rubber portion 334 should occupy between approximately twenty to fifty percent (20–50%) of the volume of tread portion 326. Since second rubber portion 334 maintains a relatively constant thickness across the tread width in this embodiment, the volume of tread portion 326 occupied by second rubber portion 334 can be approximated by its thickness. Thus, second rubber portion 334 should encompass between approximately twenty to fifty percent (20–50%) of the depth of tread portion 326. Recalling the discussion earlier, the depth of tread portion 326 includes the undertread. Preferably, second rubber portion 334 occupies approximately one-third of the total volume of tread portion 326. As stated above, this can be approximated by second rubber portion 334 encompassing approximately one-third of the total depth of tread portion 326. Groove 336 is formed, or cut, into both first rubber portion 332 and second rubber portion 334.

Second rubber portion 334 is not required to be positioned as shown in FIG. 5. The volume occupied by second rubber portion 334 in tread portion 326 is more important to the present invention than the specific radial position of second rubber portion 334 in tread portion 326. In this embodiment, second rubber portion 334 can be positioned at any location, or altitude, within tread portion 326 of tire 310. The placement of second rubber portion 334 could be based on, for example, manufacturing considerations.

Second rubber portion 334 can also have the same properties as second rubber portion 234 in the second embodiment. Thus, second rubber portion 334 should be softer and more hysteretic than first rubber portion 332. Specifically, second rubber portion 334 should be between approximately twenty and fifty percent (20–50%) softer than first rubber portion 332. Preferably, second rubber portion 334 is approximately fifty percent (50%) softer than first rubber portion 332. Second rubber portion 334 should be approximately thirty to one-hundred percent (30–100%) more hysteretic than first rubber portion 332. Preferably, second rubber portion 334 is fifty percent (50%) more hysteretic than first rubber portion 332.

Figure 6A:
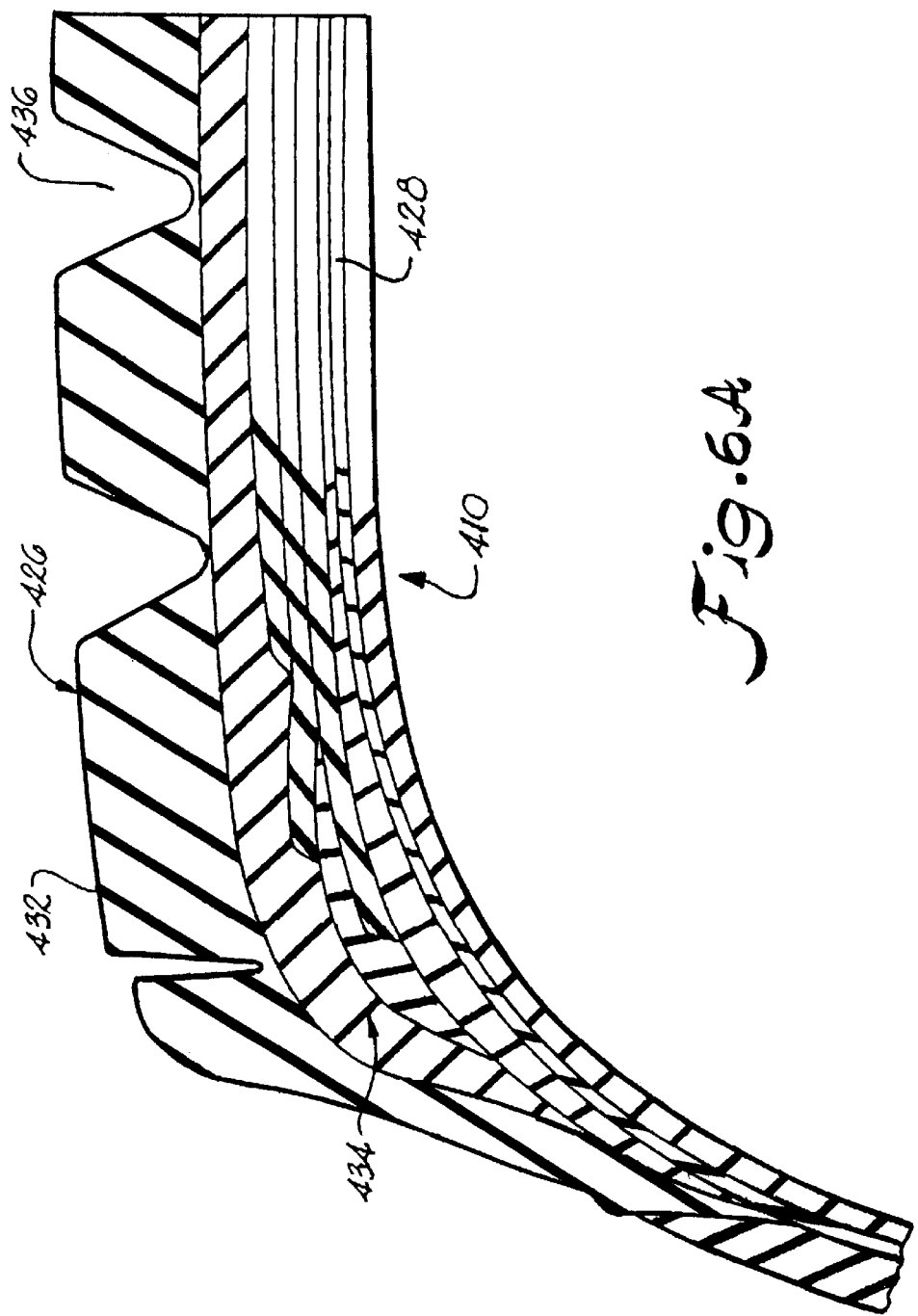
FIG. 6A is an enlarged cross sectional view of a possible configuration of the rubbers used in a fourth embodiment of the tread portion of the tire shown in FIG. 1.
Figure 6B:
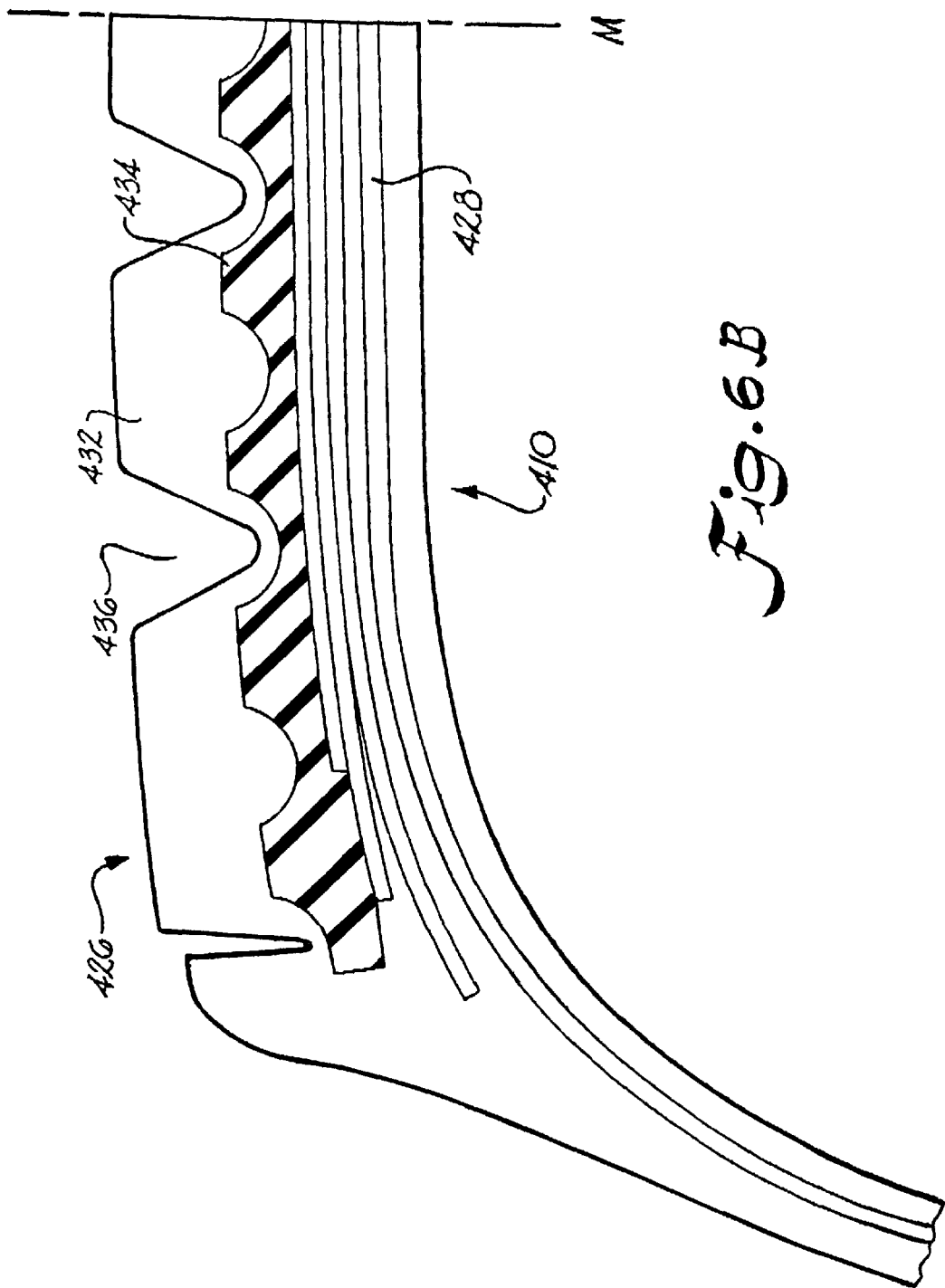
FIG. 6B is an enlarged cross sectional view of another possible configuration of the rubbers used in a fourth embodiment of the tread of the tire shown in FIG. 1.
Figure 74:
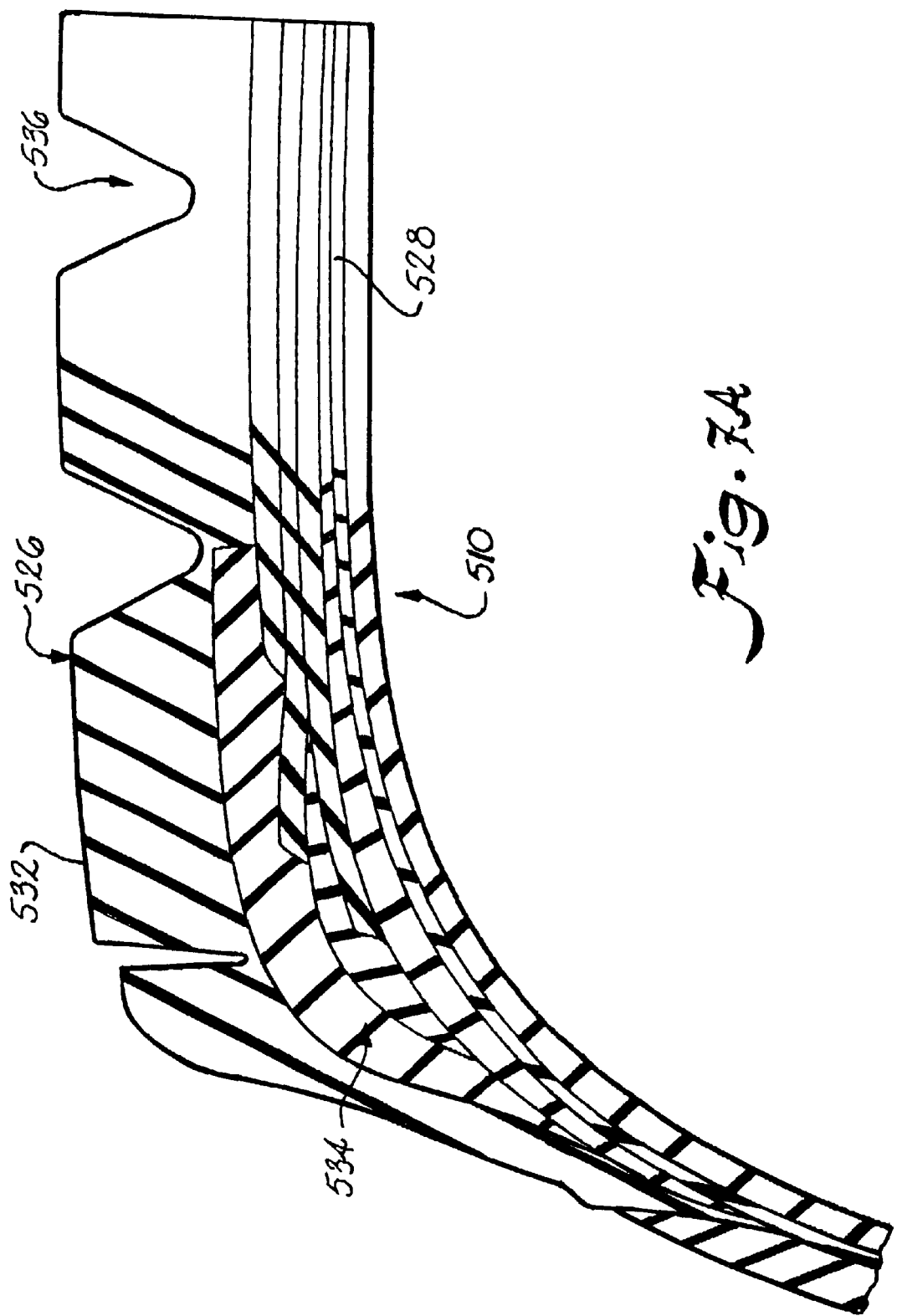

FIG. 6A–C demonstrate several possible configurations of a fourth alternative embodiment of the present invention. Tire 410 includes a second rubber portion 434 formed on belts 228; and a first rubber portion 432 positioned radially outward from second rubber portion 434. First rubber portion 432 extends laterally across the entire tread width of tread portion 426. First rubber portion 432 could be, for example, a conventional rubber.

FIG. 6A provides the first possible configuration. In this configuration of tire 410, second rubber portion 434 extends the full lateral extent of tread portion 426. First rubber portion 432 is positioned radially outward from second rubber portion 434. As seen in the figure, first rubber portion 432 forms the tread features of tread portion 426. Grooves 436, the tread blocks or ribs, and the sides are formed into first rubber portion 432. Second rubber portion 434 remains in the undertread of tread portion 426. In other words, second tread portion 434 does not extend into the tread blocks or ribs.

FIG. 6B provides the second possible configuration. In this configuration of tire 410, second rubber portion 434 extends laterally between the outermost grooves 436 in tread portion 426. First rubber portion 432 is positioned radially outward from second rubber portion 434. Slightly different than the configuration in FIG. 3A, second rubber portion 434 does not extend substantially into the laterally outermost tread ribs, which can be a decoupling, or sacrificial, rib.

Second rubber portion 434 does not maintain a flat, or planar, interface with first rubber portion 432. Second rubber portion 434 can have an undulating upper surface. Portions of second rubber portion 434 partially extend into the tread ribs or blocks. The greatest thicknesses of second rubber portion 434 occurs underneath the edges of the tread ribs or blocks. The smallest thicknesses of second rubber portion 434 occurs both beneath the grooves and in the medial portion of the tread ribs or blocks. Second rubber portion 434 does not extend to grooves 436. Grooves 436 are formed, or cut, into first rubber portion 432.

FIG. 6C provides the third possible configuration. In this configuration of tire 410, second rubber portion 434 extends the full lateral extent of tread portion 426. First rubber portion 432 is positioned radially outward from second rubber portion 434. Second rubber portion 434 does not maintain a flat, or planar, interface with first rubber portion 432. Second rubber portion 434 partially extends into the tread ribs. Second rubber portion extends to the bottom of grooves 436. Grooves 436 are formed, or cut, into tread portion 426 so that the groove bottom comprises the second rubber material. The remainder of groove 436 is formed, or cut, into first rubber portion 432.

In each of the possible configurations of the fourth embodiment, second rubber portion 434 should occupy between approximately twenty to fifty percent (20–50%) of the total volume of tread portion 426. Preferably, second rubber portion 434 occupies approximately one-third of the total volume of tread portion 426.

Since second rubber portion 434 in both FIGS. 6A and 6C maintains a relatively constant thickness across the tread width, the volume of tread portion 426 occupied by second rubber portion 434 can be approximated by its thickness. Thus, second rubber portion 434 in the configurations shown in FIGS. 6A and 6C should encompass between approximately twenty to fifty percent (20–50%) of the depth of tread portion 426. Recalling the discussion earlier, the depth of tread portion 426 includes the undertread. Preferably, second rubber portion 434 encompasses approximately one-third of the total depth of tread portion 426.

Second rubber portion 434 can also have the same properties as second rubber portion 234 in the second embodiment. Thus, second rubber portion 434 should be softer and more hysteretic than first rubber portion 432. Specifically, second rubber portion 434 should be between approximately twenty and fifty percent (20–50%) softer than first rubber portion 432. Preferably, second rubber portion 434 is approximately fifty percent (50%) softer than first rubber portion 432. Second rubber portion 434 should be approximately thirty to one-hundred percent (30–100%) more hysteretic than first rubber portion 432. Preferably, second rubber portion 434 is fifty percent (50%) more hysteretic than first rubber portion 432.

The previous alternative embodiments demonstrated the second rubber portion extending across substantially the entire lateral extent of the tread portion of the tire. The following alternative embodiment demonstrates the second rubber portion only extending across a portion of the lateral extent of the tread portion of the tire.

Figure 7B:
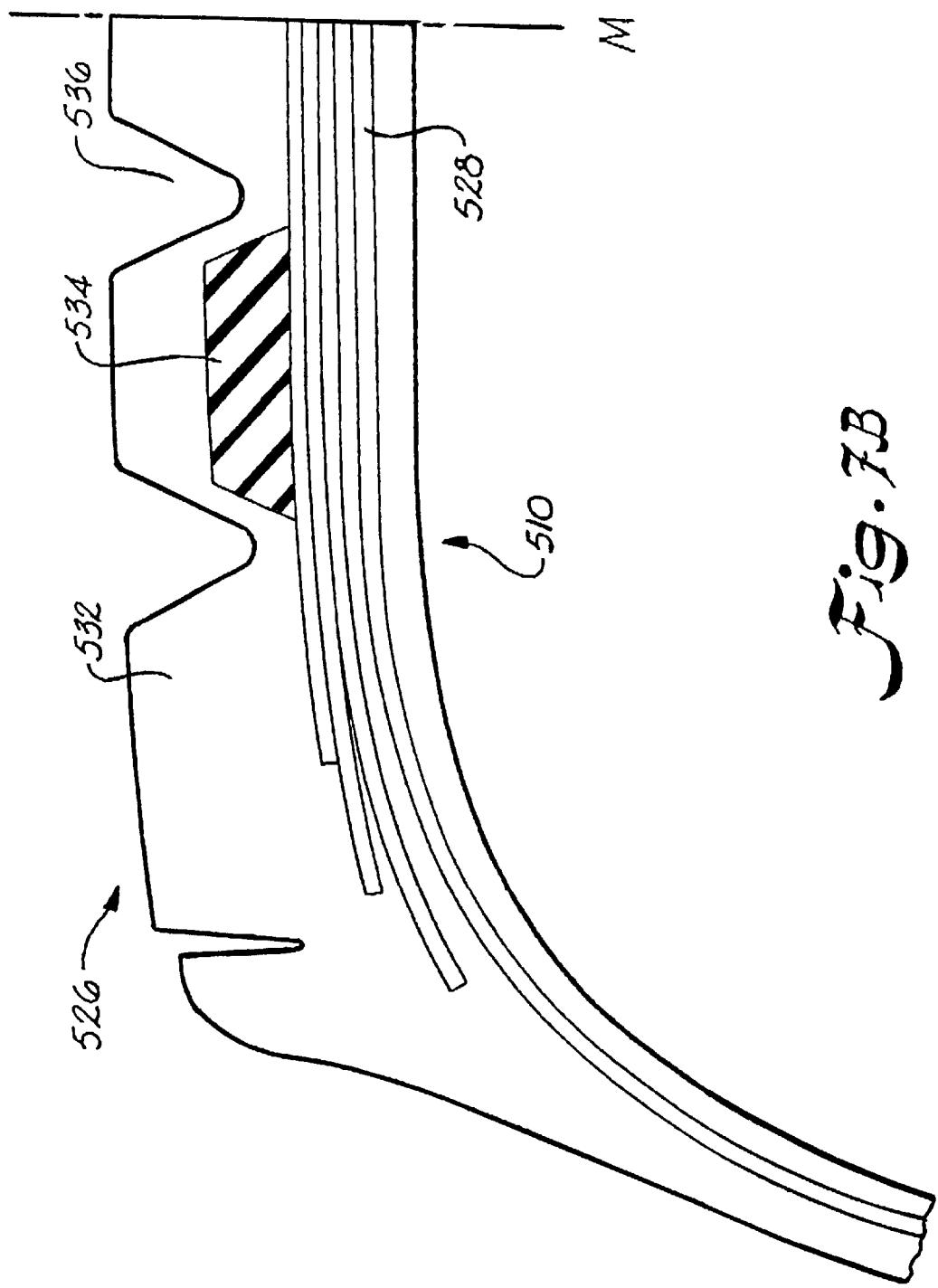
FIG. 7B is an enlarged cross sectional view of another possible configuration of the rubbers used in a fifth embodiment of the tread of the tire shown in FIG. 1.

FIG. 7A and 7B demonstrate two possible configurations of a fifth alternative embodiment of the present invention. Tire 510 includes a first rubber portion 532 and a second rubber portion 534. As discussed above, second rubber portion 534 has a limited lateral extent. First rubber portion 532 forms the remainder of tread portion 526. In the areas of tread portion 526 without second rubber portion 534, first rubber portion 532 encompasses the full depth of tread portion 526. First rubber portion 532 extends across the entire lateral extent of tread portion 526. First rubber portion 532 could be, for example, a conventional rubber. Two possible locations of second rubber portion 534 having a limited lateral extent will now be described.

FIG. 7A provides the first possible configuration. In this configuration of tire 510, second rubber portion 534 is positioned in the shoulder area of tread portion 526. First rubber portion 532 extends the entire tread width of tread portion 526. The specific configuration shown in FIG. 7A positions second rubber portion 534 on belt ply 528 and first rubber portion 532 radially outward from second rubber portion 534. The tread features of tread portion 526 shown in the figure are formed in first rubber portion 532. Second rubber portion 534 does not extend into the tread ribs. In other words, grooves 536, tread blocks or ribs, and sipes are formed into first rubber portion 532.

In this configuration, second rubber portion 534 should occupy between approximately twenty to fifty percent (20–50%) of the volume of the shoulder area of tread portion 526. Since second rubber portion 534 maintains a relatively constant thickness within the shoulder area of tread portion 526, the volume of the shoulder area of tread portion 526 occupied by second rubber portion 534 can be approximated by its thickness. Thus, second rubber portion 534 should encompass between approximately twenty to fifty percent (20–50%) of the depth of the shoulder area of tread portion 526. Recalling the discussion earlier, the depth of tread portion 526 includes the undertread. Preferably, second rubber portion 534 occupies approximately one-third of the total volume of the shoulder area of tread portion 526. As stated above, this can be approximated by second rubber portion 534 encompassing approximately one-third of the total depth of the shoulder area of tread portion 526.

Applicant recognizes that second rubber portion 534 is not required to be adjacent belt ply 528. The volume of second rubber portion 534 is more important to the present invention than the specific radial position of second rubber portion 534 in the shoulder area of tread portion 526. In fact, Applicant believes second rubber portion 534 can be positioned at any position, or altitude, within the shoulder area of tire 510. The placement of second rubber portion 534 could be based, for example, on manufacturing considerations.

FIG. 7B provides the second possible configuration. In this configuration of tire 510, second rubber portion 434 is associated with only one tread block or rib. First rubber portion 532 extends the entire tread width of tread portion 526. The specific configuration shown in FIG. 7B positions second rubber portion 534 on belt ply 528 and first rubber portion 532 radially outward from second rubber portion 534. The tread features of tread portion 526 shown in the figure are formed in first rubber portion 532. Second rubber portion 534 partially extends into the tread rib or block. However, second rubber portion 534 does not extend to grooves 536. Grooves 536 are formed, or cut, into first rubber portion 532.

In this configuration, second rubber portion 534 should occupy between approximately twenty to fifty percent (20–50%) of the volume of the area including, and beneath, the specific tread rib or block. Since second rubber portion 534 maintains a relatively constant thickness within, and beneath, the specific tread rib or block, the volume of the area including, and beneath, tread rib or block occupied by second rubber portion 534 can be approximated by its thickness. Thus, second rubber portion 534 should encompass between approximately twenty to fifty percent (20–50%) of the depth of the area including, and beneath, the specific tread rib or block in tread portion 526. Recalling the discussion earlier, the depth of tread portion 526 includes the undertread. Preferably, second rubber portion 534 occupies approximately one-third of the total volume of the area including, and beneath, the specific tread rib or block. As stated above, this can be approximated by second rubber portion 534 encompassing approximately one-third of the total depth in the area including, and beneath, the specific tread rib or block.

As with the first configuration, Applicant recognizes that rubber portion 534 is not required to be positioned in the tread rib or block as specifically shown in the figure. The volume of second rubber portion 534 is more important to the present invention than the specific radial position of second rubber portion 534 in the tread rib or block. In fact, Applicant believes second rubber portion 534 can be positioned at any position, or altitude, within the tread rib or block. The placement of second rubber portion 534 could be based, for example, on manufacturing considerations.

Furthermore, second rubber portion 534 is not limited to placement under a single tread rib or block. If appropriate, second rubber portion 534 could be positioned under a plurality of tread ribs or blocks in tire 510.

Second rubber portion 534 can also have the same properties as second rubber portion 234 in the second embodiment. Thus, second rubber portion 534 should be softer and more hysteretic than first rubber portion 532. Specifically, second rubber portion 534 should be between approximately twenty and fifty percent (20–50%) softer than first rubber portion 532. Preferably, second rubber portion 534 is approximately fifty percent (50%) softer than first rubber portion 532. Second rubber portion 534 should be approximately thirty to one-hundred percent (30–100%) more hysteretic than first rubber portion 532. Preferably, second rubber portion 534 is fifty percent (50%) more hysteretic than first rubber portion 532.

Figure 8:
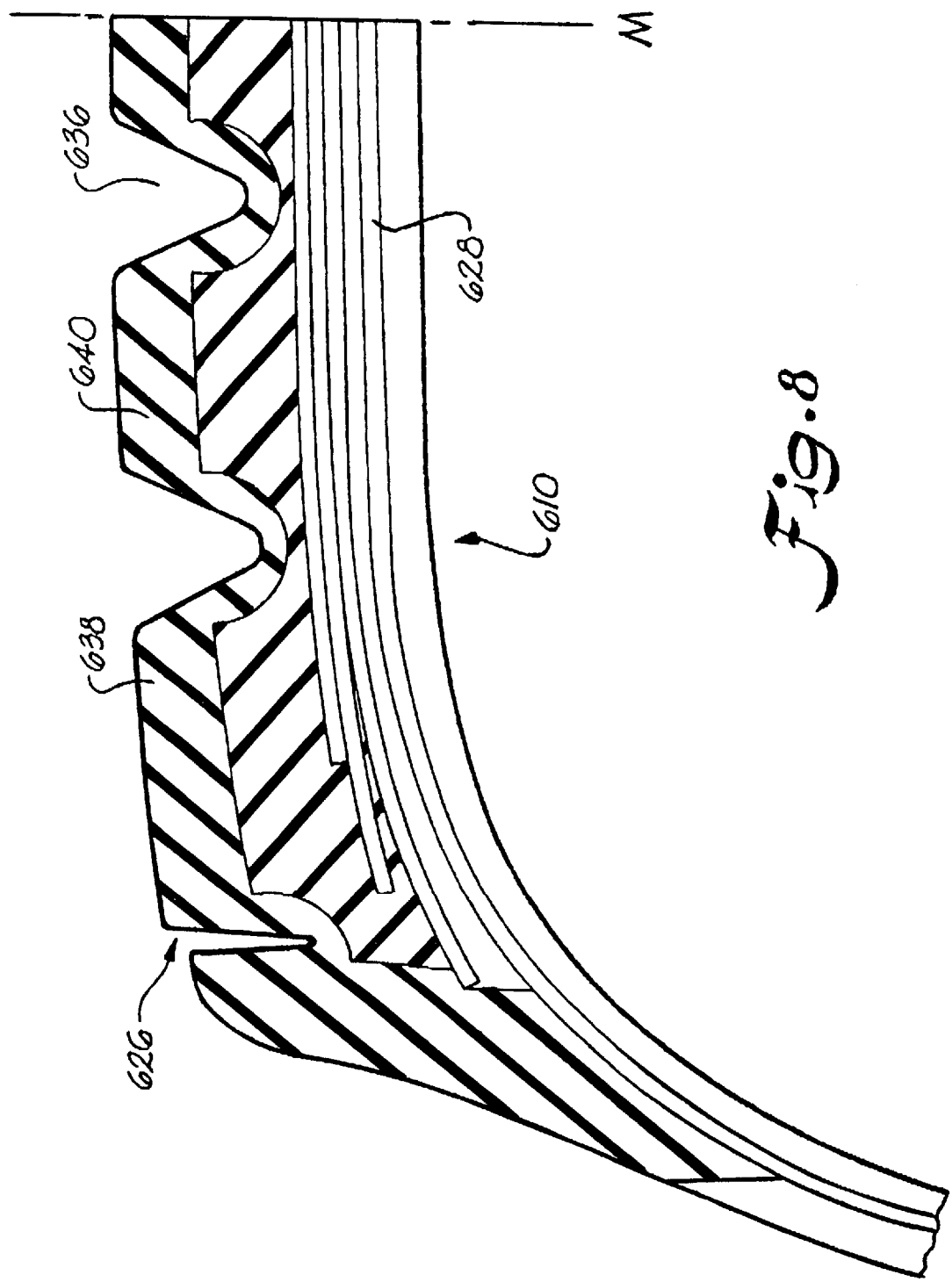
FIG. 8 is an enlarged cross sectional view of a portion of a sixth alternative embodiment of the tread portion of the tire shown in FIG. 1.
Figure 9:
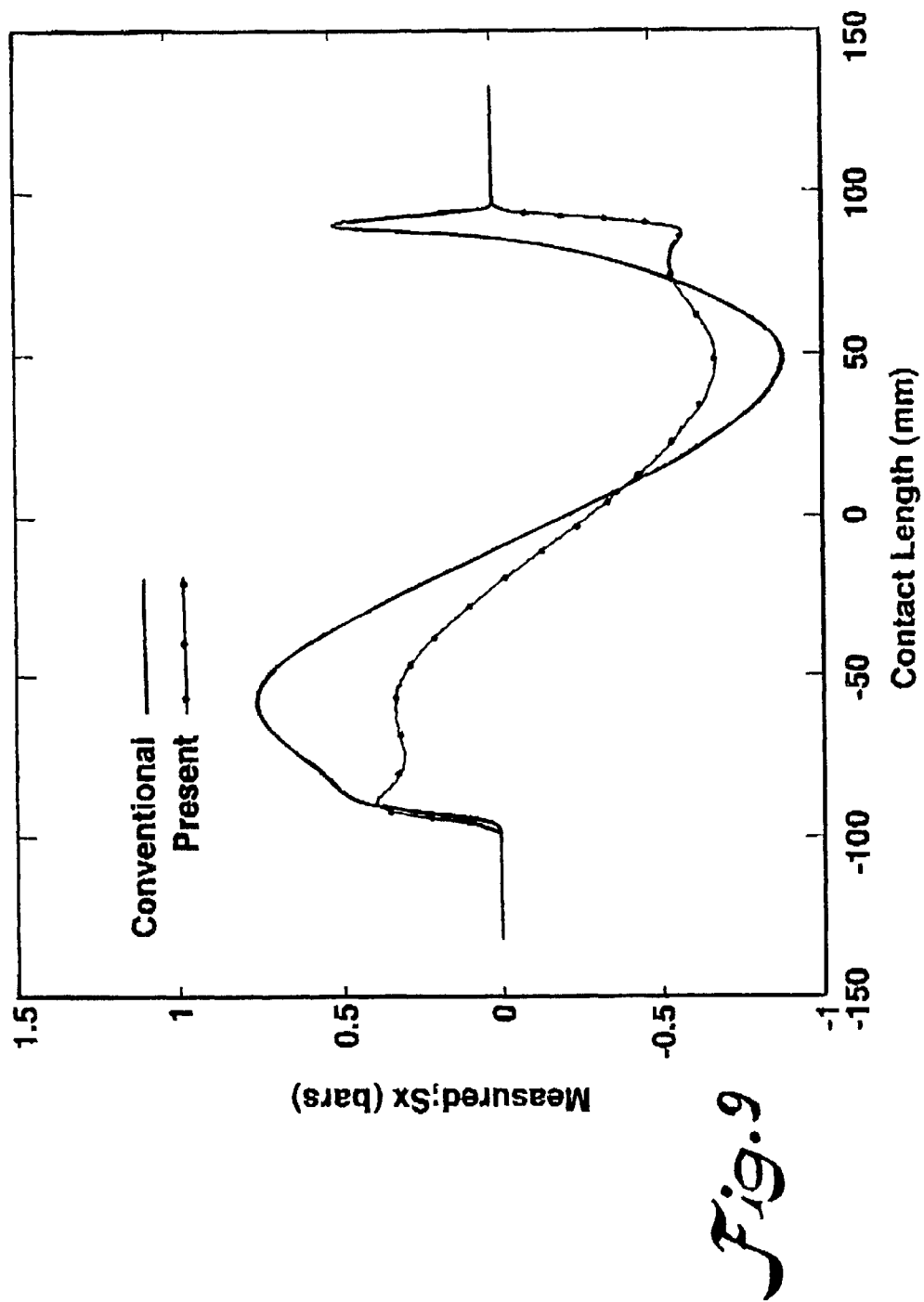
FIG. 9 is a graphical representation of the measured longitudinal contact stresses ($\sigma_x$) imposed on the contact length of a tire of the present invention compared to a conventional tire.

FIG. 8 demonstrates a sixth alternative embodiment of the present invention. The placement of the two rubber portions in this embodiment is similar to the placement of first rubber portion 432 and second rubber portion 434 in FIG. 6C. In this embodiment, tire 610 includes a tread portion 626 having a second rubber portion 640 formed on belts 628 (i.e. second rubber portion 640 forms at least part of the undertread). A first rubber portion 638 is positioned radially outward from second rubber portion 640. Second rubber portion 640 does not extend substantially into the laterally outermost tread ribs, which can be a decoupling rib.

Second rubber portion 640 does not maintain a flat, or planar, interface with first rubber portion 638. Second rubber portion 640 can have an undulating upper surface. The greatest thicknesses of second rubber portion 640 occurs in the medial portion of the tread ribs or blocks. The smallest thicknesses of second rubber portion 640 occurs beneath grooves 636. Portions of second rubber portion 640 partially extend into the tread ribs or blocks. However, second rubber portion 640 does not extend to grooves 636. Grooves 636 are formed, or cut, into first rubber portion 638.

Although similarly shaped, the physical properties of the rubber portions of this embodiment are different than the previously described embodiments. There are two possible arrangements for this embodiment.

The first possible configuration of this embodiment requires first tread compound 638 to have a modulus similar to conventional rubber compounds, but be more hysteretic than conventional rubber compounds. In other words, first tread compound 638 should be approximately thirty to one-hundred percent (30–100%) more hysteretic than conventional rubber compounds, yet essentially maintaining a conventional modulus. Preferably, first rubber portion 638 is fifty percent (50%) more hysteretic than conventional rubber compounds.

Conversely, second tread compound 640 should have a hysteresis similar to conventional rubber compounds, but be softer than conventional rubber compounds. In other words, second tread compound 640 should be between approximately twenty and fifty percent (20–50%) softer than conventional rubber compounds, yet essentially maintaining a conventional hysteresis. Preferably, second rubber portion 640 is approximately fifty percent (50%) softer than conventional rubber compounds.

In this configuration, first tread compound 638 should occupy between approximately one-half (½) to two-thirds (⅔) of the volume of tread portion 626 of tire 610. Second tread compound 640 preferably occupies between approximately one-third (⅓) to one-half (½) of the volume of tread portion 626 of tire 610. Preferably, first tread compound 638 and second tread compound 640 both occupy one-half (½) of the volume of tread portion 626.

Since first tread compound 638 and second tread compound 640 maintain a relatively constant thickness across the tread width, the volume of tread portion 626 occupied by the tread compounds can be approximated by their thicknesses. Thus, first tread compound 638 should occupy between approximately one-half (½) to two-thirds (⅔) of the depth of tread portion 626. Second tread compound 640 should occupy between approximately one-third (⅓) to one-half (½) of the depth of tread portion 626. Recalling the discussion earlier, the depth of tread portion 626 includes the undertread.

The second possible configuration of this embodiment rearranges the tread rubber compounds. First tread compound 638 should have a hysteresis similar to conventional rubber compounds, but be softer than conventional rubber compounds. In other words, first tread compound 638 should be between approximately twenty and fifty percent (20–50%) softer than conventional rubber compounds, yet essentially maintaining a conventional hysteresis. Preferably, first rubber portion 638 is approximately fifty percent (50%) softer than conventional rubber compounds.

Conversely, second tread compound 640 should have a modulus similar to conventional rubber compounds, but be more hysteretic than conventional rubber compounds. In other words, second tread compound 640 should be approximately thirty to one-hundred percent (30–100%) more hysteretic than conventional rubber compounds, yet maintaining essentially a conventional modulus. Preferably, second rubber portion 640 is fifty percent (50%) more hysteretic than conventional rubber compounds.

In this configuration, first tread compound 638 should occupy between approximately one-third (⅓) to one-half (½) of the volume of tread portion 626. Second tread compound 640 should occupy between approximately one-half (½) to two-thirds (⅔) of the volume of tread portion 626. Preferably, first tread compound 638 and second tread compound 640 both occupy one-half (½) of the volume of tread portion 626.

As discussed earlier, the volume of tread portion 626 occupied by the tread compounds can be approximated by their thicknesses. Thus, first tread compound 638 should occupy between approximately one-third (⅓) to one-half (½) of the depth of tread portion 626. Second tread compound 640 should occupy between approximately one-half (½) to two-thirds (⅔) of the depth of tread portion 626. Recalling the discussion earlier, the depth of tread portion 626 includes the undertread.

The present invention exploits the heretofore unrecognized relationship between the maximum longitudinal and lateral contact stresses imposed on the tire and the wear of the tire to provide a tire with improved wear endurance. It is understood that the invention has a scope sufficient to include the full range of values of the maximum longitudinal and lateral contact stresses to the extent that the wear improvement potential of the invention is achieved. Thus, the invention covers those tire design situations in which the geometry, composition, and location of the second rubber portion is selected to only slightly reduce the maximum longitudinal contact stresses while relatively significantly reducing the maximum lateral contact stresses.

Conversely, the invention covers those tire design situations in which the geometry, composition, and location of the second rubber portion is selected to only slightly reduce the maximum lateral contact stresses while relatively significantly reducing the maximum longitudinal contact stresses. In any event, it is to be understood that the reductions in the maximum longitudinal and lateral contact stresses are optimally selected in coordination with the impact of the second rubber portion on the handling and rolling resistance characteristics of the tire. Additionally, it will often be prudent to take into account the impact of the reduced rigidity rubber portion on the manufacturing complexity of the tire.

Applicant understands that many other variations are apparent to one of ordinary skill in the art from a reading of the above specification. For instance, the present invention is not limited to new tires. The present invention can also be used with retreaded tires and tire treads in strip form which are ultimately cured before or after mounting on a tire casing. These variations and other variations are within the spirit and scope of the instant invention as defined by the following appended claims.

I claim:

1. A tire comprising:

a pair of beads;

a carcass ply having ends, each of said ends anchored to a respective one of said beads;

at least one belt ply extending circumferentially around the tire and disposed radially outward of said carcass ply; and a tread portion extending radially outward from said at least one belt ply having a plurality of tread ribs and at least one groove formed therein, said tread portion including a first rubber portion forming a ground contacting portion and a second rubber portion forming a non-ground contacting portion disposed between the first rubber portion and the at least one belt ply in each shoulder area of the tread portion, wherein the first rubber portion has a hysteresis value and a modulus value, and the second rubber portion has a hysteresis value 30% to 100% greater than said hysteresis value of said first rubber portion and a modulus value 20% to 50% less than said modulus value of said first rubber portion and being approximately 2 and 3 N/mm² measured at 40° C. and 10% elongation, and said second rubber portion forms 20% to 50% of a thickness of the tread portion in the shoulder areas.

* * * * *